Figure 1:
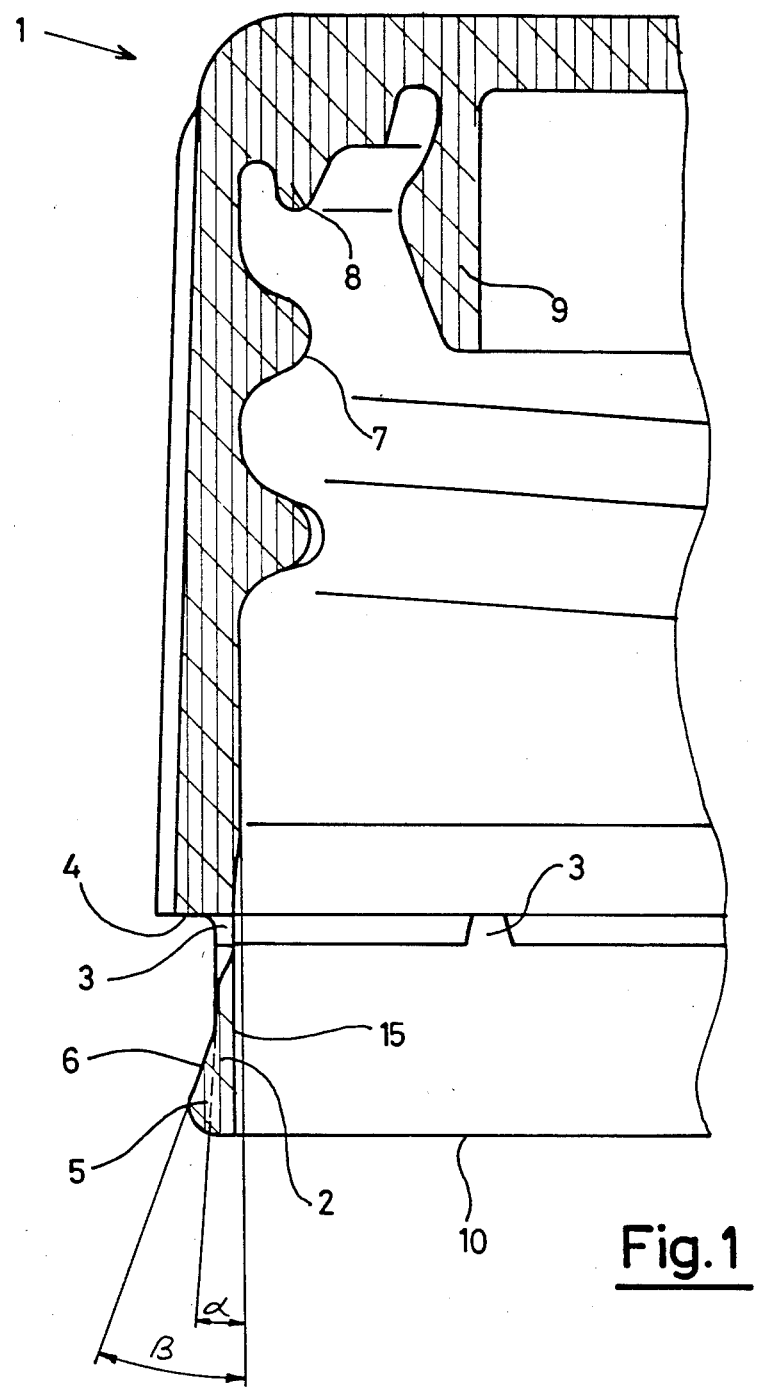

United States Patent [19]

Breuer

[11] Patent Number: 4,564,112

[45] Date of Patent: Jan. 14, 1986

[54] CLOSURE CAP FOR A CONTAINER

[75] Inventor: Hans-Werner Breuer, Himmelried, Switzerland

[73] Assignee: Crown Obrist AG, Reinach, Switzerland

[21] Appl. No.: 638,476

[22] PCT Filed: Dec. 28, 1983

[86] PCT No.: PCT/CH83/00149
§ 371 Date: Jul. 26, 1984
§ 102(e) Date: Jul. 26, 1984

[87] PCT Pub. No.: WO84/02694
PCT Pub. Date: Jul. 19, 1984

[30] Foreign Application Priority Data

Jan. 7, 1983 [CH] Switzerland .............................. 84/83

[51] Int. Cl.⁴ .............................................. B65D 41/54
[52] U.S. Cl. ...................................... 215/246; 215/252
[58] Field of Search ................................ 215/246, 252

[56] References Cited

FOREIGN PATENT DOCUMENTS

| 34997 | 9/1981 | European Pat. Off. . |
| 2282378 | 3/1976 | France . |
| 2395909 | 1/1979 | France . |
| 2439138 | 5/1980 | France . |
| 2022063 | 12/1979 | United Kingdom . |

Primary Examiner—Donald F. Norton
Attorney, Agent, or Firm—William R. Hinds

[57] ABSTRACT

In a closure cap (1) of thermoplastic material, produced by an injection moulding process, the guarantee strip (2) which is formed integrally thereon is provided, at the lower edge (2) of the closure cap, on the outside (6), with a reinforcement portion (5) which is disposed between two desired-rupture connecting web portions (3). Besides the advantages, which are already known, of a reinforcement portion on the guarantee strip, the reinforcement portion according to the invention serves as a support for bearing against the moulding tool in order to prevent stretching of the connecting web portions (3) or deformation of the guarantee strip (2) when the cap is removed from the mould.

4 Claims, 11 Drawing Figures

CLOSURE CAP FOR A CONTAINER

The invention relates to a closure cap for a container, the cap being of the type which is provided with a heat-shrinkable guarantee strip and is produced integrally with the guarantee strip from thermoplastic material in an injection molding process, wherein the guarantee strip is connected to the lower edge of the closure cap by way of a plurality of rupturable connecting web portions and is intended at least partially to embrace the neck of the container and can be brought into engagement therewith by heat-shrinking, and wherein the wall thickness of the guarantee strip has a reinforcement portion in the region between each two rupturable connecting web portions and the individual reinforcement portions are interrupted and spaced apart by portions of smaller wall thickness.

A closure cap of the kind indicated above is described for example in the European patent publication No. 34,997, published on Sept. 2, 1981. In accordance with that specification, the guarantee strip is provided on the inward side with a chord-like reinforcement, the purpose of which is to enhance the flow behaviour of the thermolastic material in the injection moulding operation. In addition, the reinforcement is intended to facilitate the operation of shrinking the guarantee strip on to the neck of the container by means of the effect of heat.

It has now been found that the dimensions of the reinforcement on the inward side of the guarantee strip can only lie within a restricted range as in that respect the dimensions and the configuration of the neck of the container must be taken into account. In addition, problems still occur when removing the closure cap from a moulding tool which opens in an axial direction, but those problems are not directly related to the reinforcement on the guarantee strip. More specifically, when stripping the closure cap from the inner tool portion, the guarantee strip is subjected to forces which act in the opposite direction to the direction of ejection from the mould and which pull the guarantee strip downwardly. As a result of that, undesirable stretching occurs at the connecting web portions which form the desired rupture locations, as the thermoplastic material is still relatively hot and stretchy after the injection moulding operation. On being removed from the mould, the guarantee strip may be deformed in particular in the region between two desired-rupture connecting web portions, in such a way that it is no longer capable of being brought into proper engagement with the neck of the container.

The object of the present invention is therefore to provide a closure cap of the kind set forth in the opening part of this specification, wherein the thickened portion on the guarantee strip can be better dimensioned in accordance with the requirements involved, and wherein in addition the operation of removing the cap from the injection moulding tool can be carried out without damaging or causing deformation of the guarantee strip.

In accordance with the invention, that object is achieved by a screw cap which includes the features that the reinforcement portions are arranged on the outward side of the guarantee strip, and the cross-sections of the reinforcement portions increase toward the lower edge of the guarantee strip.

By virtue of the reinforcement portion being disposed on the outward side of the guarantee strip, the reinforcement portion can be made of larger dimensions, as required, than would be possible in the case of a reinforcement portion disposed on the inward side of the guarantee strip. As will be described in detail hereinafter, the reinforcement portion also serves as an aid to stripping the cap out of the injection moulding tool, insofar as the guarantee strip itself is retained in the tool by the reinforcement portion upon relative movement of the internal mandrel. The fact that the cross-section of the reinforcement portion increases towards the lower end of the guarantee strip provides that the guarantee strip bears against the tool when the cap is stripped from the internal mandrel, but that nonetheless the step of ejecting the closure cap in the opposite direction is not made unnecessarily difficult.

Good properties in regard to shrinkability of the guarantee strip and the flow properties of the injection moulding material are achieved if the reinforcement portion is of substantially square or rectangular configuration in plan and extends over a sector which is equal to or smaller than half the sector between two desired-rupture connecting web portions. In some situations of use, it may also be advantageous for the reinforcement portion to be of a substantially triangular configuration, with one side of the triangle extending substantially parallel to the bottom edge of the guarantee strip.

There is also disclosed an apparatus for producing a closure cap of the kind set forth, which is simple in manufacture and which produces fault-free closure caps at high rates of output. Such an apparatus comprises an upper tool portion for forming the outside contour of the closure cap, a lower tool portion for forming the lower edge of the closure cap and the outside of the guarantee strip, wherein the plane of contact of the upper and lower tool portions lies in the plane of the lower edge of the closure cap, and comprising an inner tool portion for forming the internal contour of the closure cap and the inside and the lower edge of the guarantee strips, recesses being provided in the lower tool portion on the wall portion forming the outside of the guarantee strip, a respective recess being disposed between each two connecting web portions. The recesses may be relatively easily provided on already existing injection molding tools so that surprising improvements both in the injection molding tool itself and also in the closure cap may be achieved by a relatively simple measure.

Figure 2:
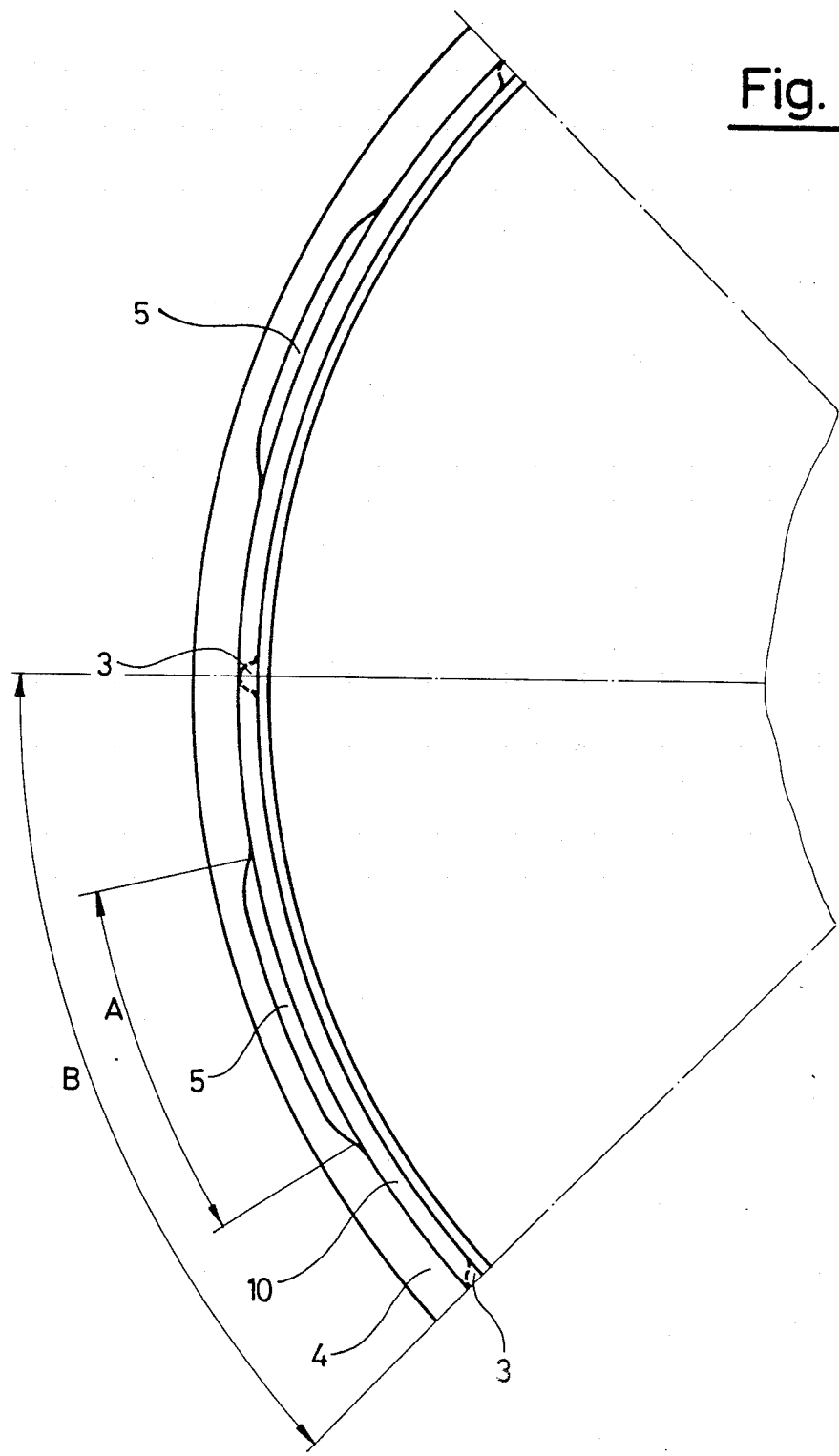
Figure 3:
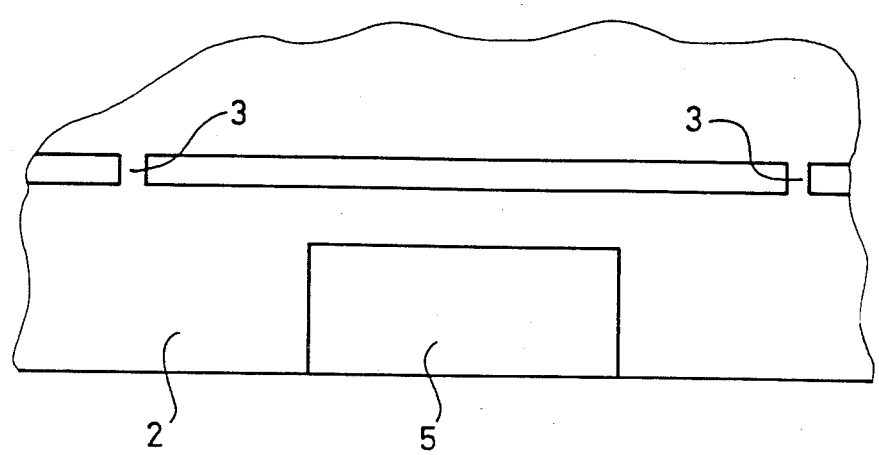
Figure 4:
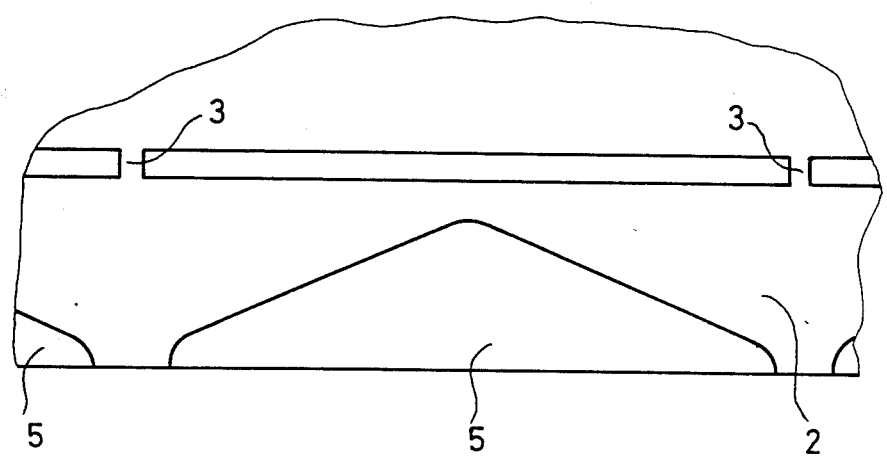
Figure 5:
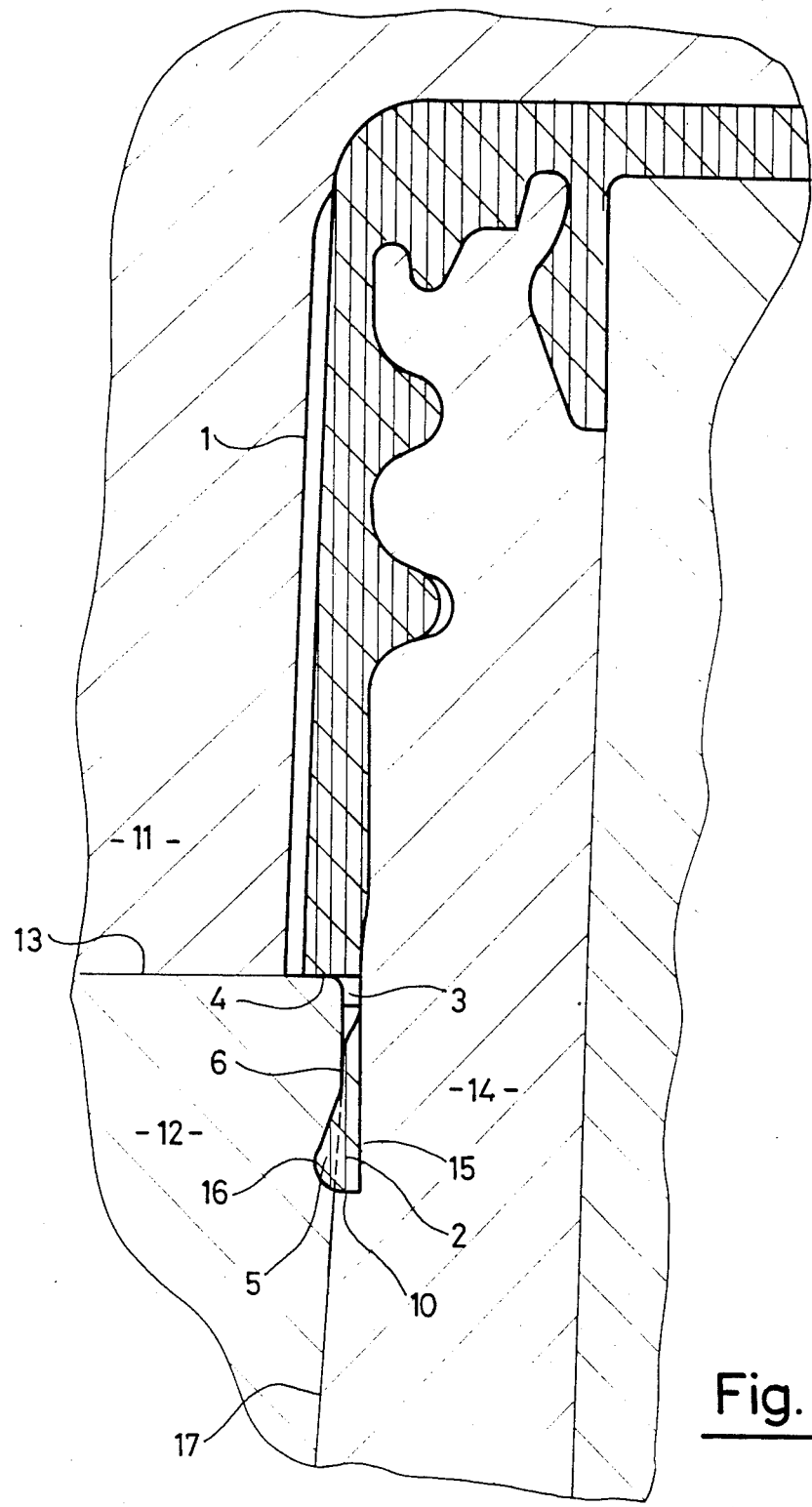

Embodiments of the invention are described in greater detail hereinafter and illustrated in the drawings in which:

FIG. 1 shows a view in cross-section of part of a closure cap according to the invention, enlarged by a factor of ten, FIG. 2 shows a view from below of part of the closure cap shown in FIG. 1, FIG. 3 shows a side view of a reinforcement portion on the guarantee strip, FIG. 4 shows a side view of modified embodiment of a reinforcement portion on the guarantee strip, FIG. 5 shows the closure cap of FIG. 1 in the injection moulding tool in a closed condition, and FIGS. 6 to 11 show the operations involved in ejecting an injection-moulded cap out of the tool, on a greatly reduced scale.

As shown in FIG. 1, a closure cap 1 is provided, as in per se known manner, with a guarantee strip 2 which is integrally connected to the lower edge 4 of the closure cap by way of desired-rupture connecting web portions 3. The closure cap illustrated also has a female screwthread 7 for screwing on to the mouth opening of a container having a male screwthread, together with a sealing lip 8 and an internal sealing means 9. It will be appreciated that the closure cap may also be of a different configuration.

It is already known for the cross-section of the guarantee strip to be of a wedge-shaped configuration, with an angle $\alpha$, because that makes it possible to use tools which open in an axial direction. The guarantee strip 2 is intended to be brought into engagement with a bead portion on the neck of the container so that, when the closure cap 1 is unscrewed, the connecting web portions 3 tear, thereby indicating that the closure cap has already been opened once. In the case of a closure cap in accordance with the illustrated construction, the guarantee strip is shrink fitted on to the neck of the container by the effect of heat. However, the configuration of the guarantee strip may also be altered in such a way that, when the closure cap is screwed on, the guarantee strip comes into engagement on the container, at the neck thereof, without being subjected to the effect of heat.

The configuration of the reinforcement portion 5 on the outward side 6 of the guarantee strip can be seen from FIGS. 1, 2 and 3. The cross-section of the reinforcement portion increases in a bead-like configuration towards the lower edge 10 of the guarantee strip and is of a wedge-like shape which is rounded off at the bottom, wherein, as illustrated, the wedge angle $\beta$ of the reinforcement portion 5 is substantially larger than the wedge angle $\alpha$ of the guarantee strip 2. The supporting action in the injection moulding tool, which is additionally achieved with the reinforcement portion 5, can be particularly clearly seen from FIG. 2. As viewed from below, the reinforcement portions 5 appear as segment-like projections which can bear against the tool, as can be seen in particular from FIG. 5.

The reinforcement portion may be of a square or rectangular configuration or approximately triangular, as shown in FIG. 4. In that case, the triangles may be of such a configuration that the tips thereof nearly touch, underneath the connecting web portions 3. The reinforcement portions of square or rectangular configuration advantageously extend over a sector A which is equal to or less than half the sector B between two connecting web portions 3.

FIG. 5 shows the planes of separation of the various parts of the tool, in the region of the guarantee strip. The upper tool portion 11 defines the external contour of the closure cap 1. The lower tool portion 12 forms the lower edge 4 of the closure cap and the outward side 6 of the guarantee strip 2. In that arrangement, the lower tool portion 12 has an internal wall surface 17 which flares conically downwardly at the wedge angle of the guarantee strip. The plane of separation 13 between the upper tool portion 11 and the lower tool portion 12 is on the plane of the lower edge 4 of the closure cap 1. The internal contour of the closure cap is formed by an internal tool portion 14 which also defines the inward side 15 of the guarantee strip and the lower edge of the guarantee strip. When the closure cap is stripped off the tool portion 14 by means of the lower tool portion 12, the closure cap itself is supported at the lower edge 4 thereof. The guarantee strip 2 in turn is supported separately by the reinforcement portions 5 which are formed by recesses 16 in the material of the lower tool portion 12. By virtue of that arrangement, the forces applied to the guarantee strip as a result of static friction when the tool portions are opened can no longer result in the connecting web portions 3 being stretched or the guarantee strip 2 being deformed. When the moulding material which reaches the guarantee strip by way of the connecting web portions 3 is injected, the reinforcement portions 5 cause the material to flow together homogeneously in the region between two connecting web portions.

FIGS. 6 to 11 show the individual relative positions of the tool portions when the injection-moulded closure cap is being removed from the mould. Details of such an injection moulding tool are known to the man skilled in the art and will therefore not be described in greater detail herein. The movements of the individual parts of the tool are produced by means of a hydraulic step-wise ejector 18.

Figure 6:
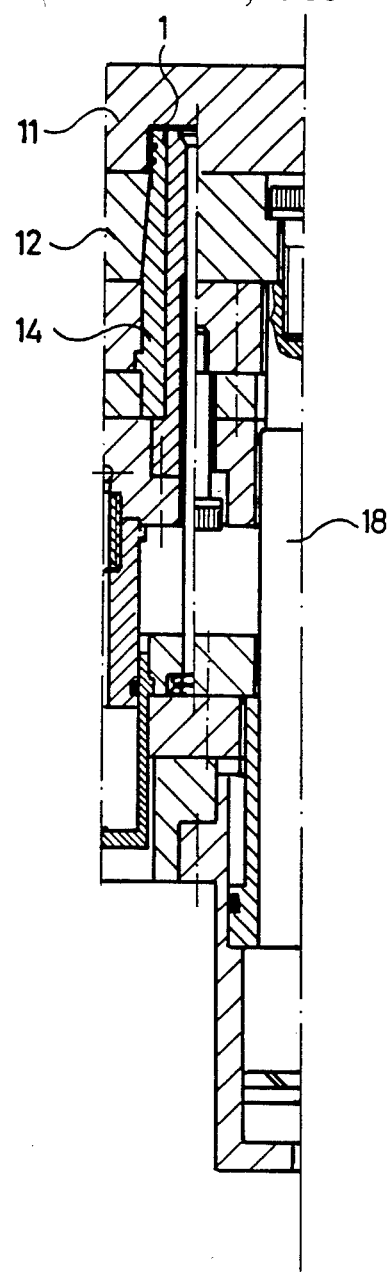
Figure 7:
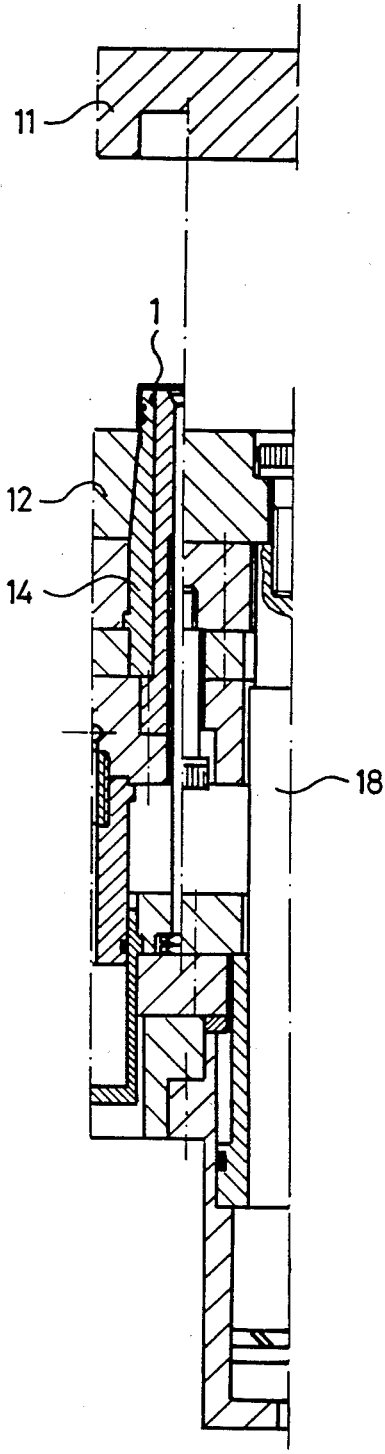
Figure 8:
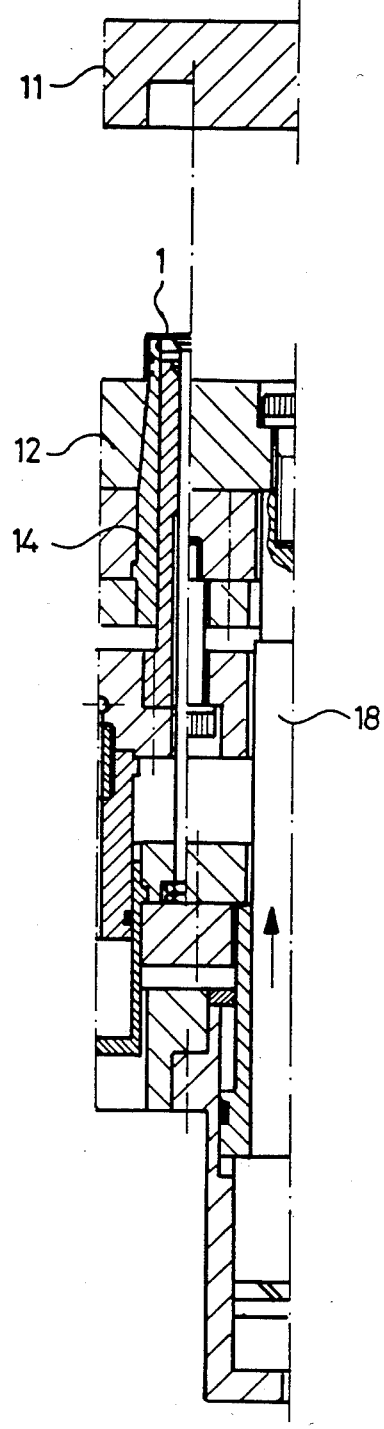

In FIG. 6, all parts of the tool are closed so that they are in the same positions as shown in FIG. 5. As illustrated in FIG. 7, the upper tool portion 11 is first raised so as to free the outside of the closure cap 1. In that operation, the closure cap 1 is retained by the inner tool portion 14. The tool portion 14 comprises a plurality of components which are concentrically fitted one into the other, as can be particularly clearly seen from FIG. 8. That is necessary in order to be able to remove the complicated internal contour of the closure cap from the moulding tool. As shown in FIG. 8, the lower tool portion 12 is first raised somewhat, together with the inner tool portion 14, so that the internal sealing means in the closure cap 1 is released. In that movement, the guarantee strip 2 is still embraced by tool portions.

Figure 9:
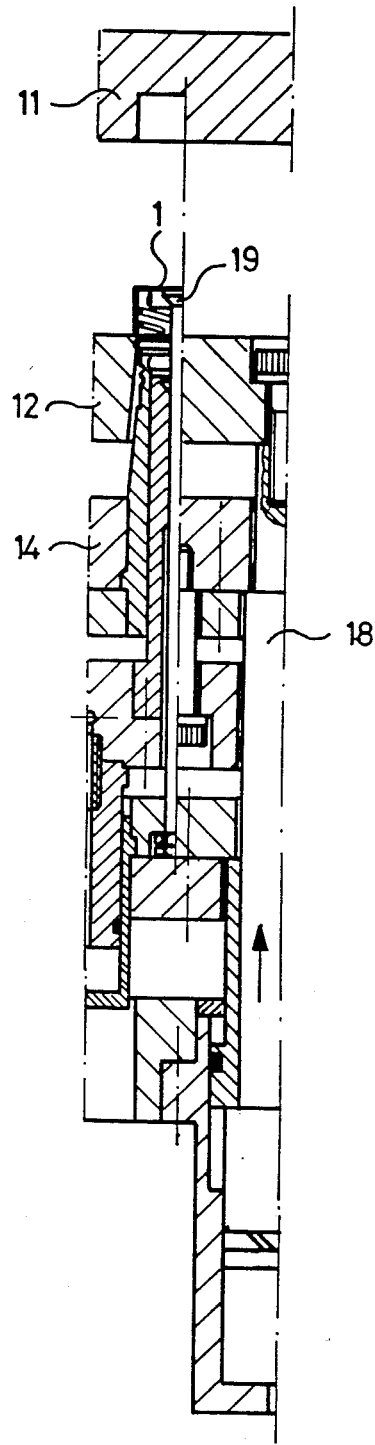

FIG. 9 shows the crucial phase in the operation of removing the moulded component from the tool, wherein the guarantee strip is removed from the moulding tool. The upper tool portion 12 is raised further so that the closure cap, together with the guarantee strip, is stripped from the inner tool portion 14. In that operation, the guarantee strip is supported at the reinforcement portions or at the recesses, as illustrated in FIG. 5. When that phase is concluded, the closure cap 1 is then only held by the lower tool portion 12.

Figure 10:
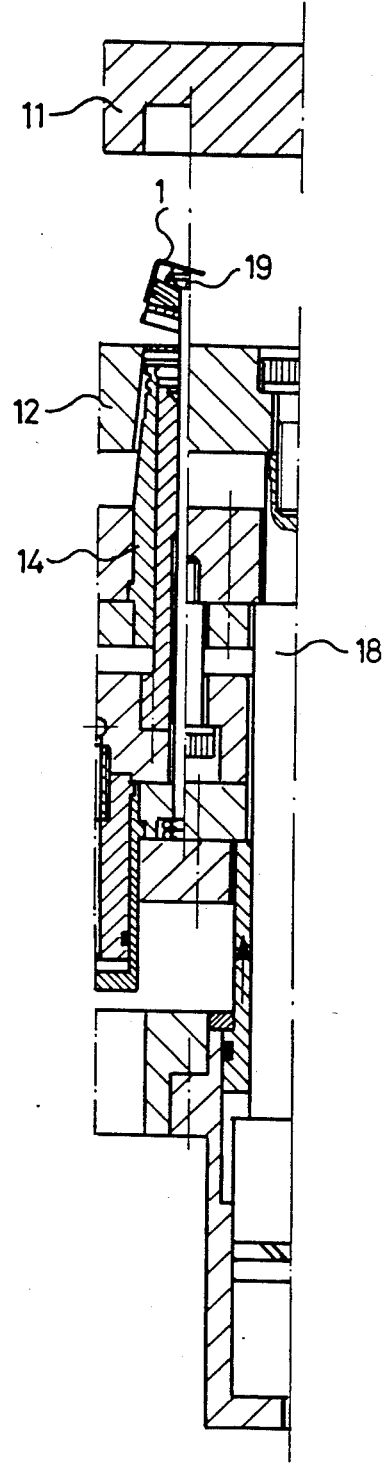
Figure 11:
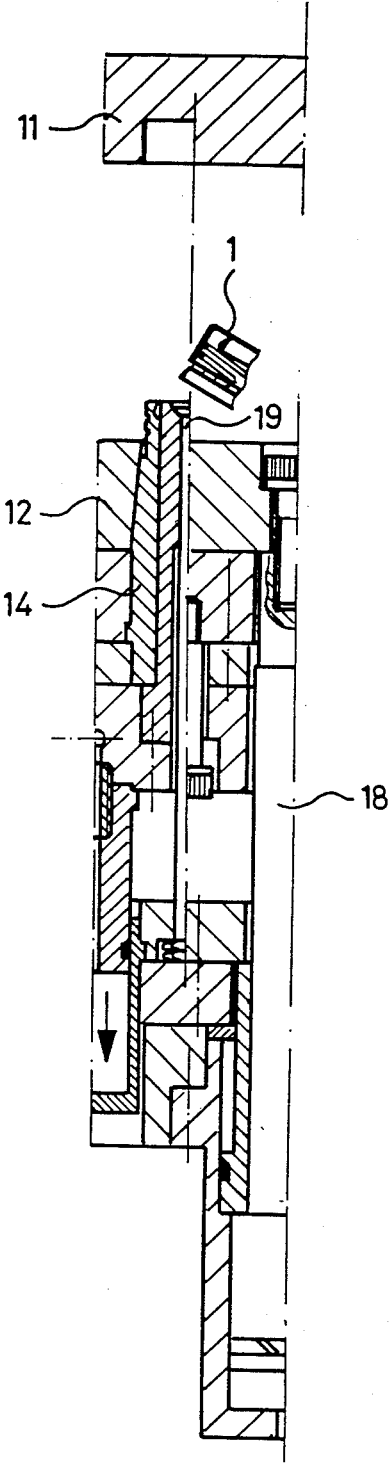

In order for the closure cap to be entirely removed from the tool, a pushrod 19 is extended, to eject the closure cap, as shown in FIG. 10. The pushrod 19 is preferably actuated pneumatically. After the closure cap is ejected, the individual tool portions move back into their original position so that the mould can be closed for a further injection moulding operation. FIG. 11 shows the tool in the condition in which there is only the upper tool portion 11 that still has to be closed.

I claim:

1. A closure cap for a container, which cap is provided with a heat-shrinkable guarantee strip (2) and is produced integrally with the guarantee strip from thermoplastic material in an injection moulding process, wherein the guarantee strip is connected to the lower edge (4) of the closure cap by way of a plurality of rupturable connecting web portions (3) and is intended at least partially to embrace the neck of the container and can be brought into engagement therewith by heat-shrinking, and wherein the wall thickness of the guarantee strip has a reinforcement portion (5) in the region between each two rupturable connecting web portions and the individual reinforcement portions are interrupted and spaced apart by portions of smaller wall thickness, including the improvement in that the reinforcement portions (5) are arranged on the outward side (6) of the gurantee strip (2) and that the cross-sections of the reinforcement portions increase towards the lower edge of the guarantee strip.

2. A closure cap according to claim 1 characterised in that at least some of the reinforcement portions are of a substantially square or rectangular cross-section.

3. A closure cap according to claim 2 characterised in that at least some of the reinforcement portions on the guarantee strip extend over a sector (A) which is equal to or smaller than half the sector (B) between two connecting web portions (3).

4. A closure cap according to claim 1 characterised in that at least some of the reinforcement portions are of a substantially triangular configuration in side view, wherein one side of the triangle extends approximately parallel to the lower edge of the guarantee strip.

* * * * *